United States Patent Office 3,826,816
Patented July 30, 1974

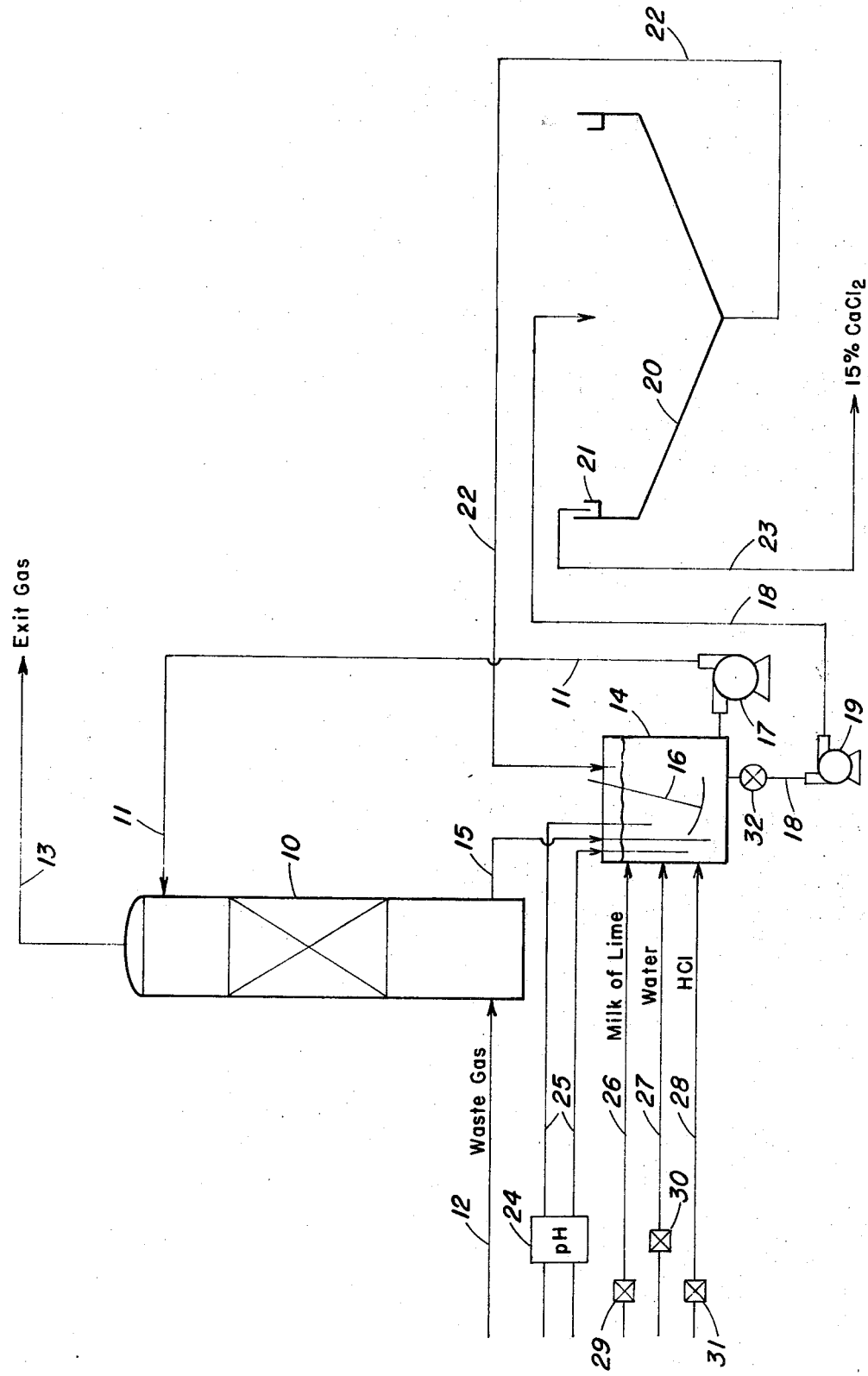

3,826,816
METHOD FOR SCRUBBING HCl FROM WASTE GASES
Walter R. McCormick, Salt Lake City, Utah, assignor to N L Industries, Inc., New York, N.Y.
Filed Sept. 13, 1972, Ser. No. 288,487
Int. Cl. C01b 7/08; C01f 11/24
U.S. Cl. 423—497         10 Claims

ABSTRACT OF THE DISCLOSURE

A system is provided whereby hot waste gases containing small amounts of hydrogen chloride plus additional combustion products including carbon dioxide, and water vapor are scrubbed substantially free of the hydrogen chloride by contacting the hot gases with a fluid scrubbing medium comprising an aqueous suspension of calcium hydroxide (milk of lime) and calcium chloride brine whereby the hydrogen chloride in the gases is converted to additional calcium chloride brine which is separated and recovered from the fluid scrubbing medium as a calcium chloride concentrate.

BACKGROUND OF THE INVENTION

The selective recovery of salts from naturally occurring brines as found in the oceans, inland seas, salt lakes, salt wells and the like disposed upon the earth's surface has been a challenge to industry for many years. While such brines contain sodium chloride as the major constituent together with lesser but nevertheless substantial amounts of the chlorides and/or sulfates of potassium and magnesium as the principal remaining salts—and hence are important industrially, their isolation and recovery from brines has not always been the most economical way of obtaining said salts as compared to other sources of supply.

Recently, however, a process has been developed for recovery of one or more of these salts from the brines of salt lakes and in particular from the brine of the Great Salt Lake in Utah, U.S.A. This process is described in detail in U.S. Pat. No. 3,516,785, issued Jan. 23, 1970 and relates in particular to the recovery of magnesium chloride from sodium, potassium, magnesium chloride and sulfate containing mixed salt solutions. The process is characterized by successive concentrations of the brine to precipitate predominantly, first, sodium salts and thereafter the potassium-magnesium double salt kainite, desulfating the mother liquor which comprises predominantly magnesium and potassium sulfates by the addition of calcium chloride brine and further concentrating to precipitate the potassium-magnesium double salt carnallite from the mother liquor. The latter is essentially a magnesium chloride solution which is heated to further concentrate the solution after which the concentrated solution is spray dried to form anhydrous magnesium chloride, which, in turn, may be converted to magnesium metal by electrolysis.

The commercial success of this or any similar process for recovering salts and/or magnesium metal from brines depends largely on making the most effective use of each and every component including reaction products, waste gases and the like involved in the recovery process. This is illustrated in the process of the above-identified U.S. patent, wherein first and second order concentrations of the magnesium chloride solution are heated to dryness in a spray drier using as the heat source the hot exhaust gases derived from a gas turbine which is used to drive an alternating current generator for generating the electrical energy requirements of the overall process. In the process of spray drying the concentrated solutions of magnesium chloride to dryness a portion of the $MgCl_2$ is decomposed into MgO and gaseous HCl by reaction with the $H_2O$ in the hot exhaust gases. The hot gases leaving the spray drier are recycled to the first and second concentrators where they are used as the heat source for effecting successive concentrations of the magnesium chloride solutions mentioned above. The waste gases from the concentrators have approximately the following analysis on a weight percent basis:

|  | Percent |
| --- | --- |
| HCl | 0.42 |
| $N_2$ | 70.64 |
| $O_2$ | 16.20 |
| $CO_2$ | 3.74 |
| $H_2O$ | 9.01 |

In as much as it is desirable to remove the HCl from these waste gases before exhausting to the atmosphere, they are sent to a scrubber where the HCl is removed from the gases by scrubbing the gases with relatively insoluble calcium carbonate, in the form of an oolitic sand, which reacts with the HCl in the waste gases to form $CaCl_2$ brine.

In this connection, however, it has been found that when using an oolitic sand slurry as scrubbing medium, such as disclosed in the aforesaid U.S. Pat. 3,516,785 only about ⅓ utilization of the oolitic sand is effected. Moreover, due to the normally low concentrations of hydrogen chloride (0.35-0.45%) in the waste gases reaction of the oolitic sand slurry with the gases produces a $CaCl_2$ brine of very low calcium chloride concentration, too low in fact to be used for most industrial purposes.

SUMMARY OF THE INVENTION

The present invention relates in general to an improved process for scrubbing HCl from hot industrial waste gases and in particular the hot waste gases exhausted from concentrators used to concentrate solutions of magnesium chloride produced from salt brines derived from inland salt lakes.

It has now been found that the problems heretofore encountered in scrubbing HCl from hot waste gases, using oolitic sand as a scrubbing medium, can be effectively overcome by employing an efficient and economical cyclic process wherein the scrubbing medium comprises an aqueous suspension of calcium hydroxide, sometimes referred to as milk of lime, plus calcium chloride brine, the scrubbing medium being continuously recycled through a scrubber co-current or countercurrently, as the case may be, to the flow therethrough of the hot waste gases. The removal of hydrogen chloride from the gases is effected by reaction of the HCl with the calcium hydroxide to produce calcium chloride brine, and by using this cyclic process substantially 100% of the hydrogen chloride in the waste gases is removed. Moreover, by providing a scrubbing medium comprising milk of lime plus calcium chloride brine, and recycling the scrubbing medium, optimum use is made of the milk of lime and the concentration of the calcium chloride brine is raised to a level at which it can be used for other industrial purposes.

DESCRIPTION OF THE DRAWINGS

The drawing is a schematic illustration of a scrubbing system comprising a scrub tower having means for feeding waste gases and a scrubbing medium thereto; and means for collecting the calcium chloride brine and recycling fresh scrubbing medium to the tower.

PREFERRED EMBODIMENT OF THE INVENTION

The present invention relates in particular to a cyclic process for removing substantially all of the HCl from the hot waste gases derived from a spray drier used for dehydrating hydrous magnesium chloride, wherein the hot waste gases are contacted with a continuously recycled scrubbing medium comprising an aqueous suspension of calcium hydroxide and calcium chloride brine. To this end it is preferred that the scrubbing medium comprise a calcium chloride brine of about 15 weight percent calcium chloride. It will be understood, however, that the concentration of the lower calcium chloride brine is not critical and may be higher or lower than 15%, the only criterion being that the concentration be commensurate with other industrial uses, for example, the most efficient and economical desulfating of the aforesaid mother liquor.

With reference again to the conversion of the HCl in the hot waste gases to a calcium chloride brine, intimate contact between the gases and the scrubbing medium is achieved through the use of a scrubbing tower in which the gases flow preferably counter current to the scrubbing medium. In the particular embodiment described therein, the reaction may take place at ambient temperature or at elevated temperatures such as about 140° F. which corresponds substantially to the temperature of the waste gases derived from the concentrators. However, at this higher temperature, the amount of $CO_2$ evolved is greatly reduced and since the evolution of $CO_2$ and the removal of HCl are desirable, it is preferred to carry out the reaction at temperatures below 140° F.

The reaction between the hydrogen chloride in the waste gases and the calcium hydroxide in the scrubbing medium produces water, gaseous $CO_2$ and calcium chloride brine. Initially, the latter will be of relatively low concentration, but in accordance with the objects stated above, by continuously recycling the brine, together with the milk of lime, to the scrubber, the concentration of the brine may be increased and ultimately maintained at the level commensurate with any predetermined industrial use.

As mentioned above, one of the products of the reaction is gaseous $CO_2$ and initial experiments demonstrated that if the pH of the scrubbing medium in the scrub tower is allowed to go above 7, the gaseous $CO_2$, whether originating from the reaction or present in the gases being scrubbed, will react with the calcium chloride present to produce insoluble calcium carbonate; and that the latter will be deposited in the scrubber and pipe lines thereby lowering scrubbing efficiencies and eventually plugging the equipment. It is essential, therefore, that the pH of scrubbing medium be held below about 7.

On the other hand, it has been found that if the pH of the scrubbing medium is allowed to go below about 3, then the efficiency of the scrubbing medium in terms of removal of HCl from the waste gases, drops sharply. In this connection, it is axiomatic that the waste gases are strongly acid (low pH) and hence, when contacting the scrubbing medium, the pH of the latter will be lowered and would continue to decrease as the scrubbing medium is recycled. In keeping therefore with the objects of this invention, the pH of the scrubbing medium issuing from the scrub tower is continuously monitored and suitable adjustments made in its pH to maintain the latter within the range of from at least about 3 to no higher than about 7 and preferably from about 5 to 6, before being recycled to the scrub tower.

Turning now to the drawing, the latter illustrates, schematically, suitable apparatus for achieving the objectives of the invention wherein a scrub tower 10 having from 2 to 6 disc-and-donut type contractors and packed with flexirings (Koch Engineering) is provided with a main inlet line 11 at its upper end through which the scrubbing medium, in this case an aqueous suspension of calcium hydroxide and calcium chloride brine is fed into the upper end of the scrub tower. Consistent with the preferred method of contacting the scrubbing medium with the waste gases, the latter are fed through inlet line 12 into the bottom of the scrub tower, the flow rate of the gases upwardly in the tower being such that the gases pass upwardly countercurrent to the downward flow of the scrubbing medium. The scrubbed gases, which consist primarily of carbon dioxide, and oxygen escape into the atmosphere by way of outlet pipe 13 at the top of the scrub tower.

The specific gas flow rates and rate of flow of the scrubbing medium used to effect removal of HCl from the waste gases will depend upon such factors as the size and design of the apparatus used. However, using the apparatus described herein and shown schematically in the attached drawing, which apparatus is for purposes of illustration and not by way of limitation, a flow rate of waste gases upwardly through the scrub tower at about 25.0 s.c.f.m. with the scrubbing medium flowing downwardly at about 1.74 g.p.m. effected 100% removal of HCl from the gases.

It will be understood, however, that the aforesaid flow rates are not limiting of the scope of the invention; and that other flow rates, depending upon the dimensions of the apparatus, compositions of the waste gases and the like can readily be arrived at by those having ordinary skill in the art.

During contact of the gases with the scrubbing medium, the hydrogen chloride is converted to additional calcium chloride brine and water, which, together with the scrubbing medium, are discharged from the bottom of the scrub tower into a mixing vessel 14 via discharge pipe 15. The mixing vessel is shown with mechanical stirrer, indicated schematically at 16, by which the contents of the mixing vessel are constantly agitated. The recycle circuit of the scrubbing medium includes the aforesaid main line 11 connected at its lower end thru pump 17 to the mixing vessel 14 adjacent to the bottom thereof; and a secondary line 18, one end of which is also connected, thru a pump 19, to the bottom of the mixing vessel. The opposite end of the secondary line 18 leads to the upper end of a clarifier 20 which is provided adjacent its upper rim with an annular weir for the accumulation of clarified $CaCl_2$. The bottom of the clarifier is provided with a discharge pipe 22 which is adapted to deliver the residual calcium hydroxide suspension, i.e., $Ca(OH)_2$ plus some $CaCl_2$ brine, back to the mixing vessel 14. The clarified $CaCl_2$ accumulating in the annular weir 21 is pumped out of the weir via pipe line 23 to a suitable storage tank, or directly to the mother liquor hereinabove described.

As mentioned above, it is essential that the pH of the scrubbing medium entering the top of the scrub tower via main line 11 be within a range of from 3 to 7 and preferably about 5 to 6. Hence, means are provided to constantly monitor the pH of the scrubbing medium being discharged from the scrubber into the mixing vessel 14; and to effect a change in pH, if necessary, to come within the essential range specified above.

Suitable means for monitoring the pH include a pH meter, indicated generally at 24, together with suitable terminals 25—25 immersed in the mixing vessel, for constantly metering the pH of the medium therein. In addition, suitable feed lines, indicated generally at 26, 27, and 28 are connected to the mixing vessel 14 and adapted to deliver milk of lime, and/or water and/or HCl, respectively (from suitable sources not shown), to the scrubbing medium in vessel 14 in response to the reading of the pH meter.

Delivery of these additives to vessel 14 by manual operation of suitable valves 29, 30 and 31 in the respective pipe lines; or may be effected automatically by suitable electrically energized valve operating means, responsive to readings of the pH meter.

At start of the scrubbing cycle, the waste gases passing upwardly through the scrubber will be contacted by a scrubbing medium comprising essentially an aqueous suspension of calcium hydroxide, and hence, the concentration of the $CaCl_2$ brine formed in the scrubber at the outset will be low, i.e. 15% $CaCl_2$. Consequently, valve 32 in pipe line 18 is closed initially, thereby shutting off flow of the liquid scrubbing medium to the clarifier until such time as the concentration of $CaCl_2$ brine being recycled to the scrubbing tower via pipe line 11 reaches approximately 15%. Thereafter, the valve 32 is opened allowing a portion of the scrubbing medium in the mixing vessel to pass through pipe line 18 to the clarifier 20 in which the residual milk of lime suspension settles out and is recycled by pipe line 22 to the mixing vessel 14; while the $CaCl_2$ concentrate is bled-off from the top of the clarifier via pipe line 23 and sent to storage or directly to mother liquor for desulfating the latter.

As explained above, during recycle of the scrubbing medium, its pH is constantly being monitored by pH meter 24 and adjustments made when and if necessary by admitting the additives milk of lime, water or HCl into the mixing vessel 14 in amounts to maintain the pH of the scrubbing medium being recycled preferably in the range from 5 to 6.

The following examples will serve to further illustrate the invention:

EXAMPLE 1

The scrub tower 10 was a plexiglass cylinder six inches in diameter and 54 inches high with six sets of disc-donut-contractor plates, having a ¼ inch wall thickness and packed 40 inches high with flexirings (Koch Engineering) ½ inch wide and ½ inch long. The recycle system included a two liter mixing vessel located immediately below the discharge end of the scrub tower. The mixing vessel was provided with a motor driven stirring blade operated at about 1,750 r.p.m. As shown in the drawing, a pH meter was mounted adjacent the mixing vessel with its terminals extending into the vessel; and three feed lines intersected the wall of the vessel for feeding the additives, milk of lime, water or HCl thereto in accordance with the readings of the pH meter 24 so as to maintain the pH of the scrubbing medium in the vessel, within the prescribed range. In this example, the pH of the scrubbing medium was maintained at about 5.6 by manual control of the aforesaid valves in the additive lines connected to the vessel 14. A portion of the scrubbing medium in the vessel was recycled directly to the top of the scrubbing tower by a pump and feed line; while another portion of the scrubbing medium was pumped to a clarifier where clarified $CaCl_2$ was separated from residual calcium hydroxide suspension and the latter recycled to the mixing vessel.

The gas stream to be scrubbed comprised from 0.03 to 1.8% HCl; from 2.84 to 3.33 weight percent $CO_2$, the balance air and was sent upwardly through the scrub tower at a substantially constant rate of 25 s.c.f.m. The waste gases may comprise, if desired, from about 0.03 to about 2.0 weight percent HCl, from about 2.5 to about 3.5 weight percent $CO_2$ and the balance air.

The scrubbing medium comprised 10 weight percent calcium hydroxide, 15 weight percent $CaCl_2$, balance water and was introduced into the top of the scrub tower at a flow rate of 1.74 g.p.m. In this experiment, the temperature of the scrubbing medium was ambient temperature or about 72° F.

At the outset of the run, the valve 32 of the clarifier recycle line was closed so that the scrubbing medium within the vessel was recycled directly to the scrubber and this condition was maintained until the concentrations of $CaCl_2$ brine being produced had reached about 15%. Thereafter, the valve 32 was opened so that a portion of the scrubbing medium went to the clarifier where the $CaCl_2$ was separated and recovered from the residual calcium hydroxide suspension—which, in turn, was recycled to the mixing vessel.

During a test run of approximately 10 minutes, substantially 100 weight percent of the HCl and 10.01 weight percent of $CO_2$ were recovered from the waste gas. There was no evidence of $CaCO_3$ concentrations in the scrubber or associated parts.

EXAMPLE 2

In this run, substantially the same operating conditions were maintained as in Example 1, except that the temperature of the scrubbing medium in the mixing vessel was raised to 140° F. by introducing a heating element therein.

It was found that the high gas flow rate effected a significant heat loss as a consequence of which the temperature of the scrubbing medium stabilized at 100° F. after 10 minutes.

In this run again, 100 weight percent of the HCl was removed from the gases, but only about 1.9 weight percent of the $CO_2$; nor was there any evidence of calcium carbonate scale in the scrubber or its pipe lines.

From the foregoing description and examples, it will be seen that the invention provides a relatively simple, inexpensive method and means for scrubbing 100% of the hydrogen chloride from waste gases containing relatively small amounts of hydrogen chloride, carbon dioxide, balance air, wherein the gases are brought into contact with a continuously recycled scrubbing medium consisting of calcium hydroxide (milk of lime) and $CaCl_2$ brine; and that by contact of the gases with the scrubbing medium, the HCl in the gases is scrubbed out as a calcium chloride brine which is bled off at a concentration of at least 15% $CaCl_2$ for industrial use such as, for example, feeding directly to mother liquor for desulfating the latter. Moreover, no deposits of $CaCO_3$ are formed in the scrub tower and hence, the cyclic operation may be carried out continuously and at high efficiencies.

The invention may be carried out in other specific ways than those herein set forth without departing from the essential characteristics of the invention, and the present embodiment is therefore to be considered in all respects as illustrative and not restrictive, and all changes coming within the meaning and equivalency range of the appended claims are intended to be embraced therein.

What is claimed is:

1. A cyclic process for scrubbing waste gases containing hydrogen chloride, carbon dioxide and balance air to remove the hydrogen chloride therefrom as a relatively high calcium chloride brine concentrate comprising the steps of: contacting said waste gases with a scrubbing medium comprising a suspension of calcium hydroxide and said relatively high calcium chloride brine concentrate to convert the hydrogen chloride in said gases to newly formed calcium chloride brine of relatively low concentration in said scrubbing medium, maintaining the pH of said scrubbing medium within the range of from 3 to 7 to insure efficient conversion of said hydrogen chloride to calcium chloride brine and to inhibit formation of insoluble calcium carbonate, the pH of said scrubbing medium being maintained in said range by continuously monitoring the pH of said scrubbing medium and adding a suitable reagent thereto depending on its pH, continuously recycling said scrubbing medium into contact with additional waste gases to convert newly formed calcium chloride brine of relatively low concentration to a brine of relatively high concentration and simultaneously recovering a portion of the highly concentrated calcium chloride brine from the recycled scrubbing medium.

2. A cyclic process according to Claim 1 wherein said relatively high calcium chloride brine concentrate comprises about 15% calcium chloride.

3. A cyclic process for scrubbing waste gases containing hydrogen chloride, carbon dioxide and balance air to remove the hydrogen chloride therefrom as a calcium chloride brine concentrate of about 15% calcium chloride comprising: feeding a scrubbing medium comprising a suspension of calcium hydroxide and said calcium chloride brine concentrate into the upper end of a scrub tower, feeding said waste gases into the lower end of said scrub tower and upwardly therein countercurrent to the downward flow of said scrubbing medium to convert the hydrogen chloride in said gases to newly formed calcium chloride brine of relatively low concentration, discharging the scrubbing medium from the lower end of said scrub tower into a receiving vessel, maintaining the pH of the scrubbing medium in a range of from 3 to 7 to insure efficient conversion of said hydrogen chloride to calcium chloride brine and inhibit formation of insoluble calcium carbonate by monitoring the pH of the scrubbing medium in the receiving vessel and adding suitable reagents thereto to adjust its pH in said pH range in accordance with said monitoring means, continuously recycling the pH adjusted scrubbing medium from said receiving vessel to the upper end of said scrub tower, simultaneously withdrawing a portion of said scrubbing medium from said receiving vessel and recovering calcium chloride brine concentrate of about 15% calcium chloride from said portion of said scrubbing medium.

4. A cyclic process for scrubbing waste gases according to Claim 2 wherein the pH adjusting reagents are selected from the group consisting of milk of lime, water, HCl and mixtures thereof.

5. A cyclic process for scrubbing waste gases according to Claim 2, wherein the portion of the calcium chloride brine concentrate recovered from said scrubbing medium includes a residual calcium hydroxide suspension, separating said residual calcium hydroxide suspension from said calcium chloride brine concentrate and recycling said residual calcium hydroxide suspension to said scrubbing medium.

6. A cyclic process for scrubbing waste gases according to Claim 2, wherein the pH of said scrubbing medium is maintained in the range from 5 to 6.

7. A cyclic process for scrubbing waste gases according to Claim 2, wherein contact between said waste gases and said scrubbing medium is effected by maintaining countercurrent flow of said waste gases and said scrubbing medium, respectively.

8. A cyclic process for scrubbing waste gases according to Claim 6, wherein said waste gases comprise from about 0.03 to about 2.0 weight percent HCl, from about 2.5 to about 3.5 weight percent $CO_2$ and the balance air.

9. A cyclic process for scrubbing waste gases according to Claim 3, wherein the scrubbing medium and said pH adjusting reagents are continuously agitated.

10. A cyclic process for scrubbing waste gases according to Claim 3, wherein the portion of the scrubbing medium withdrawn from said receiving vessel, is clarified to separate the calcium chloride brine concentrate from residual calcium hydroxide suspension and recycling said residual calcium hydroxide suspension to said receiving vessel.

References Cited
UNITED STATES PATENTS

| | | | |
|---|---|---|---|
| 2,165,784 | 7/1939 | Burrage | 423—240 |
| 2,394,863 | 2/1946 | Lundin | 423—163 |
| 3,386,798 | 6/1968 | Berans et al. | 423—215 |
| 3,516,785 | 6/1970 | Smith | 423—163 |

EDWARD STERN, Primary Examiner

U.S. Cl. X.R.

23—260; 423—155, 163, 240, 481